United States Patent [19]

Nakamura et al.

[11] Patent Number: 4,785,449
[45] Date of Patent: Nov. 15, 1988

[54] NETWORK SYSTEM FOR DATA TRANSMISSION AMONG PLURAL COMMUNICATIONS STATIONS CONNECTED TO A COMMUNICATION MEDIUM

[75] Inventors: Yasuo Nakamura, Fuchu; Makoto Chida, Yokohama, both of Japan

[73] Assignee: Canon Kabushiki Kaisha, Tokyo, Japan

[21] Appl. No.: 733,769

[22] Filed: May 14, 1985

[30] Foreign Application Priority Data

May 21, 1984 [JP] Japan ................................ 59-102359
May 21, 1984 [JP] Japan ................................ 59-102360

[51] Int. Cl.$^4$ ............................ H04J 3/02; H04J 3/16
[52] U.S. Cl. ........................................ 370/85; 370/95
[58] Field of Search ...................... 370/45, 60, 94, 89

[56] References Cited

U.S. PATENT DOCUMENTS

| | | | |
|---|---|---|---|
| 4,320,502 | 3/1982 | deVeer | 370/85 |
| 4,445,214 | 4/1984 | Reynolds et al. | 370/85 |
| 4,456,956 | 6/1984 | El-Gohary et al. | 370/85 |
| 4,491,946 | 1/1985 | Kryskow, Jr. et al. | 370/89 |
| 4,511,958 | 4/1985 | Funk | 370/85 |
| 4,551,721 | 11/1985 | Kozlik | 370/85 |

Primary Examiner—Douglas W. Olms
Assistant Examiner—Frank M. Scutch, III
Attorney, Agent, or Firm—Fitzpatrick, Cella, Harper & Scinto

[57] ABSTRACT

There is disclosed a data transmission network system for data transmission among plural stations by token passing method. A station which has acquired the right of communication for the first time transmits relevant information to all other stations in the network so that smooth token passing can be achieved without the use of a monitor station in the network.

17 Claims, 8 Drawing Sheets

| ADDRESS | CONTENT | |
|---|---|---|
| | | |
| A 1 | 1ST NODE ADDRESS a1 | ~Aa1 |
| A 2 | 2ND NODE ADDRESS a2 | ~Aa2 |
| A 3 | 3RD NODE ADDRESS a3 | ~Aa3 |
| ⋮ | ⋮ | |
| A n | n TH NODE ADDRESS an | ~Aan |
| ⋮ | ⋮ | |
| B | TOKEN DESTINATION ADDRESS b | ~Ab |

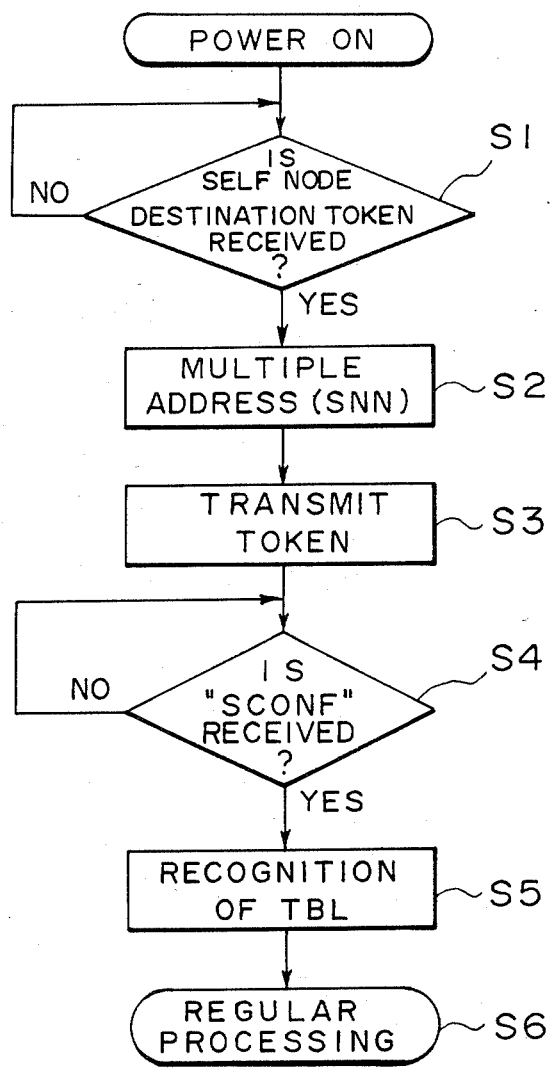
F I G. 5

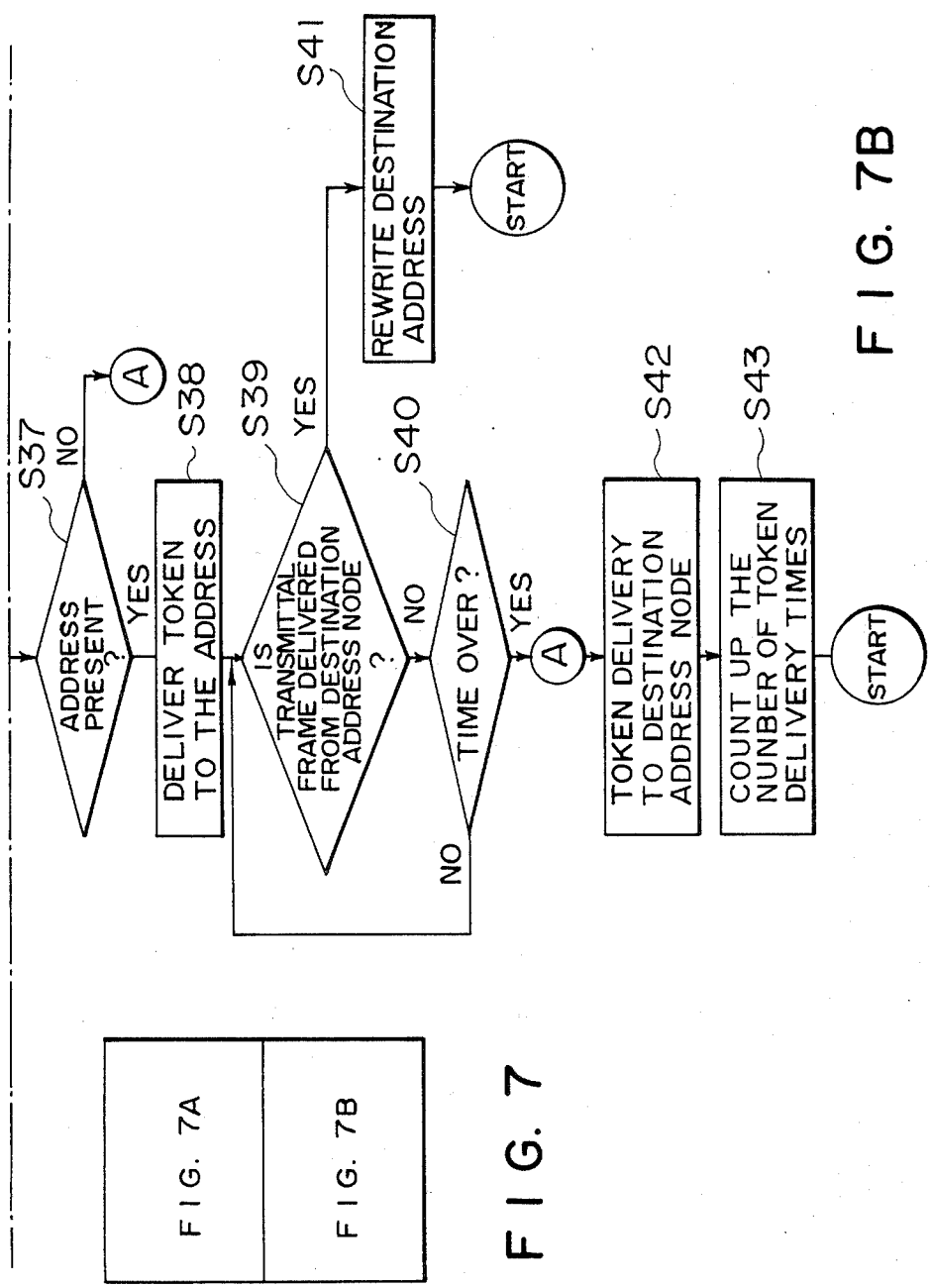

NETWORK SYSTEM FOR DATA TRANSMISSION AMONG PLURAL COMMUNICATIONS STATIONS CONNECTED TO A COMMUNICATION MEDIUM

BACKGROUND OF THE INVENTION

1. Field of the Invention

The present invention relates to a data transmission control process in a network system for data transmission among plural communication stations connected to a communication medium, with token passing method.

2. Description of the Prior Art

There has been proposed so-called local area network or LAN, in which plural office equipment such as office computers, word processors, facsimiles etc. are mutually connected by an inexpensive and simple communication network channel, and token passing method is known as a communication control method in such local area network.

In this method, control information or command indicating the transfer of right of communication, called token, is circulated in the network, and a station (hereinafter called node) which has caught the token or has been designated thereby acquires the right of communication. Each node acquires the right of communication and initiates the communication only after receiving the token, and, after the communication, transfers the right of communication by passing the token to a succeeding node (hereinafter called downstream node).

In a data transmission from a node to another node in the local area network, the transmission frame generally contains an address of the destination. In order to determine the address of the destination, each node has to be able to recognize the system structure in the network by some means. Stated differently each node has to recognize the addresses of the nodes present in the network.

For this purpose there has generally been adopted a method of providing the network system with a monitor node for administering the entire system, wherein said monitor node transmits the information on the system structure to other nodes.

In such conventional method, however, many functions are concentrated on the monitor node and the data transmission becomes impossible once it develops a malfunction. In order to avoid such inconvenience, there should be provided substitute means in case of a failure of the monitor node, or some additional means in order to improve the reliability of the system. Besides said method is originally not suitable for a network principally aimed at distributed control, such as LAN. Also the use of a particular monitor node in a small-scale network system inevitably raises the cost of the system.

SUMMARY OF THE INVENTION

In consideration of the foregoing, an object of the present invention is to provide a network system enabling efficient data transmission.

Another object of the present invention is to provide a network system satisfactorily adaptable to changes in the network system.

Still another object of the present invention is to provide a network system allowing easy recognition of a station or node newly joining the network system.

Still another object of the present invention is to provide a data transmission control method which allows each node in the network to efficiently recognize the system structure of the network without the use of a particular monitor node.

The foregoing and still other objects of the present invention, and advantages thereof, will become fully apparent from the following description.

BRIEF DESCRIPTION OF THE DRAWINGS

FIG. 5 is a flow chart showing the procedure of controlling new entries of nodes to the network in said embodiment;

FIGS. 7, 7a and 7b are flow charts showing the procedure for data transmission control and for recognizing a newly joining node in a second embodiment.

DETAILED DESCRIPTION OF THE PREFERRED EMBODIMENTS

Now the present invention will be clarified in detail by embodiments thereof shown in the attached drawings.

Figure 1:
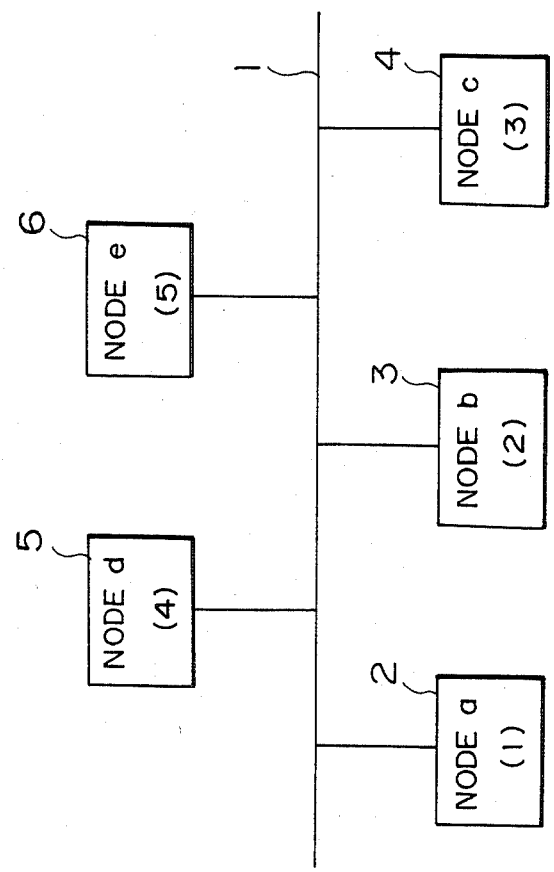
FIG. 1 is a schematic view showing the structure of an example of the local area network according to the present invention.

FIG. 1 shows the system structure of a local area network embodying the present invention, wherein 1 is a bus-type transmission channel constituting a communication medium and composed of a metal or optical fiber cable, and 2-6 are nodes a(1), b(2), c(3), d(4) and e(5) connected to said communication channel, in which the parenthesized figures indicate the addresses of said nodes. It is to be noted that the communication medium may also be composed of a ring-formed transmission channel, and that the number of nodes connected to the transmission channel is not limited to that in the present embodiment.

Figure 2:
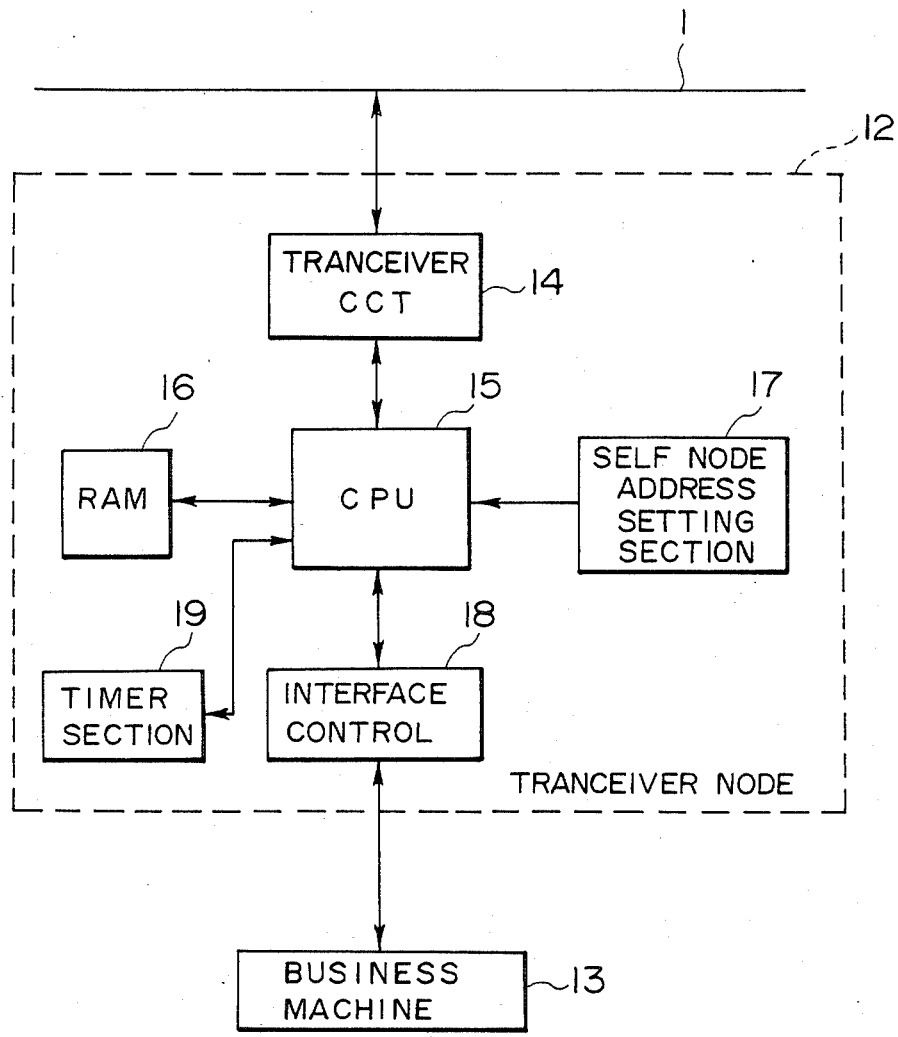
FIG. 2 is a block diagram of a communication station embodying the present invention.

FIG. 2 is a block diagram showing an example of the structure of a node employed in the embodiment shown in FIG. 1. In FIG. 2, 1 indicates a transmission channel of the network same as shown in FIG. 1, 12 is a transmitting-receiving node corresponding to one of the nodes a-e shown in FIG. 1, and 13 is an office equipment to be connected to the node 12.

The node 12 is provided therein with a transceiver circuit 14 including modulator, demodulator etc.; a microprocessor (CPU) 15 storing a control procedure therein and controlling the entire node according to said control procedure; a random access memory (RAM) 16 for storing various information; a self node address setting unit 17 composed for example of dip switches for defining the address of this node; an interface control unit 18 for input-output control for the office equipment 13; and a timer unit 19. The above-described structure performs the functions of data transmission from the office equipment 13 to the transmission channel 1 and data reception from said transmission channel 1 to said office equipment 13.

Figures 3, 4:
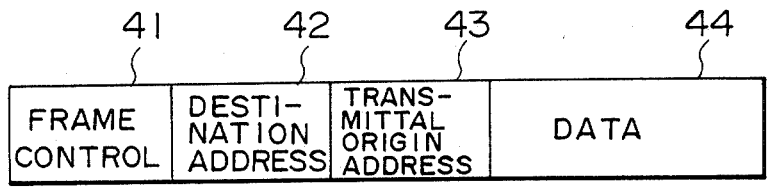
FIG. 3 is a chart showing an example of the network structure table in said embodiment.
FIG. 4 is a chart showing an example of the format of the transmission frame to be adopted in said embodiment.

FIG. 3 shows a part of the memory areas in the RAM 16, wherein areas Aa1-Aan constitute a network structure table (TBL) storing a first node address a1, a second node address a2, a third node address a3, ..., an n-th node address an. An area Ab stores an address b of the destination of the token. The above-mentioned areas have start addresses A1-An, B in the RAM 16.

FIG. 4 shows an example of the formal of the transmission frame of data employed in the present embodiment, wherein included are a frame control area (FC) 41 for a communication control command, such as a token or communication right transfer command, representing the nature of the transmission frame; a destination address area (DA) 42; a sender address area (SA) 43; and a data area (TD) 44 for various data.

Figure 6A:
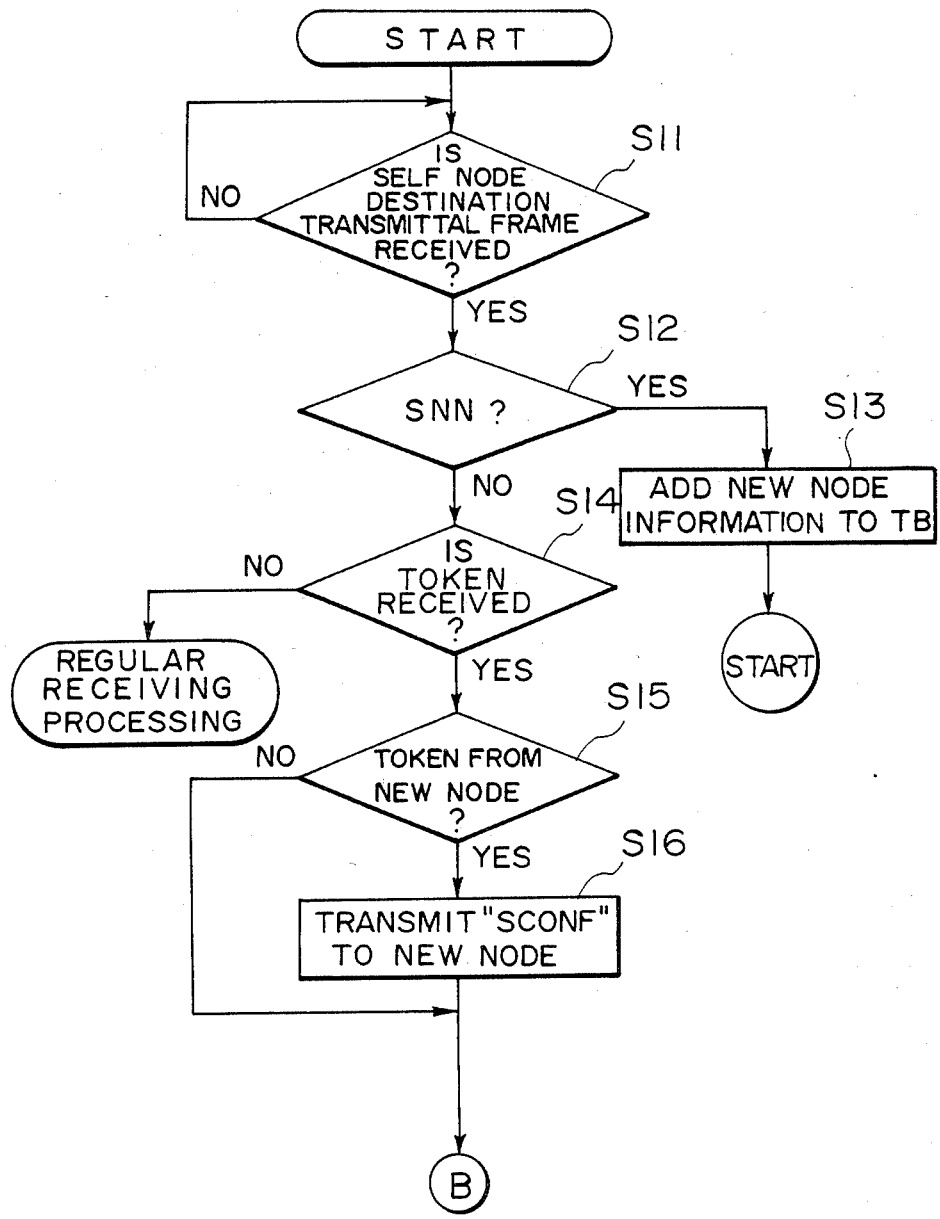
FIGS. 6a and 6b are flow charts showing the procedure for recognizing a newly joining node and transmitting the network structure in a first embodiment.
Figure 6B:
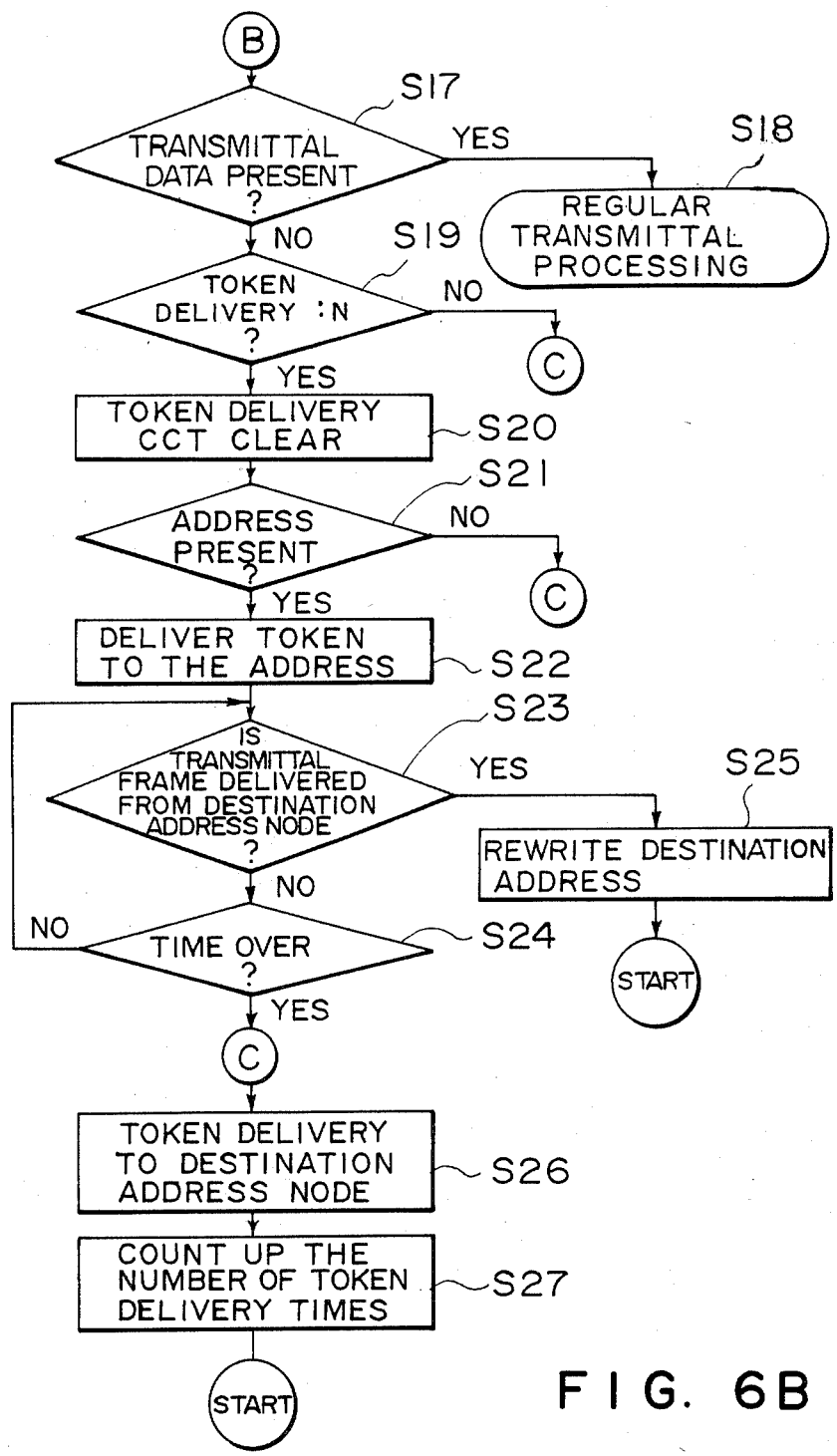

Now reference is made to the flow charts shown in FIGS. 5 and 6 for explaining the procedure of recognition of the network structure in the local area network of the present embodiment.

In the normal state, the CPU 25 in the node 12 awaits the reception of the communication right transfer command or token. The frame of the token contains an address of the destination, and, in case said address of destination coincides with the address designated by the self node address setting unit 17, the node receives the token to acquire the communication right.

The node which has acquired the right of communication by the reception of token sends data to the transmission channel 1 through the transceiver circuit 14 in case data transmission is requested for example by the office equipment 13. Upon completion of the transmission or in the absence of such request, the token is transferred to a downstream node.

In the network shown in FIG. 1, it is assumed that the nodes a(2), b(3), d(5) and e(6) are in operable state while the node c(4) is not powered and not operable.

In this state it is also assumed that the network structure table TBL in the RAM 16 of each operable node is already formed and stores values a1=1, a2=2, a4=4 and a5=5 respectively corresponding to the nodes a2, b3, d5 and e6.

In case the node c4 is inoperable in the network system shown in FIG. 1, the token is circulated in the order of node e6, d5, b3, a2 and again e6. Consequently, for example in the node d5, the address b of the RAM 16 indicating the destination of the token stores the address "2" of the node b3.

In the following there will be given an explanation on the function of the node d in the aforementioned state where the nodes a, b, d and e are operable but the node c is inoperable, while making reference to the flow charts (A) and (B) in FIG. 6 showing the procedure of data transmission control. The procedures shown in said flow charts (A), (B) are programmed in advance in the CPU 15 of the node.

In the node d5, a step S11 inspects whether the transmission frame addressed to this frame is sent from the transmission channel 1, and, upon reception thereof, a step S12 discriminates whether it is an SNN command to be explained later.

If not, the program proceeds to a step S14 for discriminating whether a token is received. If not, a normal reception procedure is executed. If the token is received, the program proceeds to a step S15 to discriminate whether the received token is a first token, generated as will be explained later, from a node which has newly joined the network.

If it is not the token from a new node, the program proceeds to a step S17 to identify whether a data transmission is requested from the office equipment 13 connected to this node. In the presence of such request, a step S18 executes a regular transmission procedure.

In the absence of request for data transmission in the step S17, the program proceeds to a step S19 to discriminate whether the number of token transfers is equal to a number N. The node d5 normally transfers the token to the node b3 but it tries, once in every N transfers, to transfer the token to the node c4 with the address "3" positioned between the node d5 of the address "4" and the node b3 of the address "2", thus identifying whether said node c4 has become operable.

If the number of token transfers is not equal to N, the program proceeds to a step S26 to send the token to a node designated by the token destination address b in the RAM 16, which is the node d5 in this example, then a step S27 stepwise increases the number of token transfers in a token count area in the RAM 16, and the program then returns to the step S11.

In case the step S19 identifies that the number of token transfers is equal to N, the program proceeds to a step S20 to clear said number to "0", and a step S20 investigates whether there is another address between the own address designated by the self node address setting unit 17 and the token destination address b stored in the RAM 16. In the present example there exists an address "3" between the address "4" of the node d5 and the current token destination address "2" of the node b3, so that the program proceeds to a step S22 to generate and send a token having a destination address "3". Then the timer unit 19 is activated, and steps S23 and S24 inspect whether a transmission frame is sent from the node of the destination address within the preset time of the timer unit 19. In the absence of reception of said transmission frame within said time, indicating that the node c4 is still inoperable, the program proceeds from the step S24 to a step S26 for sending the token to the node b3 corresponding to the token destination address "2" stored in the RAM 16.

On the other hand, if the node c4 is powered and is capable of joining the network, it acquires the communication right by the token from the node d5, thus performing the transmission of transmission frames such as SNN command to be explained later or token. The node d5 detects said transmission in the step S23, and the program then proceeds to a step S25 whereby the destination address b in the RAM 16 is changed from "2" to "3" since the node c4 has newly joined the network and the address "3" thereof has become effective. Then the program returns to the step S11 to await the reception of the token from the node e6.

Each node receives and sends the token in the above-described manner, and a node which has newly joined the network can acquire the token as it is periodically sent to the node that has been regarded as inoperable.

In the present embodiment the token is transferred to a newly joining node by periodic generation of a token bearing the address of a particular node which has been regarded as inoperable, but it is also possible to transmit data which do not specify the address but allow new entry to all the inoperable nodes in the system. In this case, however, there may occur a data collision on the transmission channel in case there are plural newly joining nodes.

Now reference is made to FIG. 5 showing the procedure of network entry control for explaining the process in the node c4 when the power supply is turned on. The program of the flow chart shown in FIG. 5 is also stored in the CPU of the node. When the power supply to the node c4 is turned on, said node c4 awaits, in a step S1, the reception of the token. In this state, the TBL in the node c4 is naturally not formed yet. Upon detection of the token in the FC 41 in the received data, the program proceeds to a step S2, in which the node c4 sends a new entry notice command (hereinafter called SNN) to all the nodes in the network. Said command is transmitted simultaneously to all the nodes in one transmission, setting a command indicating the SNN command in the FC 41, setting own address in the sender address area 43, further setting "1" in all the bits constituting the destination address area 42 and using for example a global address indicating a simultaneous transmission to all the nodes at the same time. It is however possible also to send said SNN command individually to each node.

After sending the SNN command, a step S3 sends the token to the downstream node, thus transferring the communication right. The downstream node is designated for example by employing "own address minus 1" as the destination address DA. Same result can be obtained by setting said destination address in the token destination address area. Then the node c4 awaits, in a step S4, the sending of a network structure notice command (SCONF) from the downstream node b3. As will be explained later, the SCONF command contains, in the data area 44, the information on the network structure (TBL) stored in the RAM 16 of the node b3, so that the node c4 stores, in a step S5, the content of the data area 44 of the SCONF command received in the step S4, into the TBL area of the RAM 16 of said node c4. Subsequently there is executed a regular process in a step S6.

Now reference is made to the flow chart (A) shown in FIG. 6 for explaining the procedure of recognizing the newly joining node and sending the network structure in the node b3 which is the downstream node of the node c4.

At first a step S11 inspects the reception of a transmission frame to this node from the transmission channel 1. In this operation the global address is also regarded as the address to this node. Upon reception of said transmission frame, a step S12 discriminates whether the received frame is an SNN command addressed to all the nodes. If so, a step S13 adds the sender address 43 contained in the transmission frame, which is the address "3" of the node c4 in this case, to the TB1 in the RAM 16. Then the program returns to the step S11 to prepare for the reception of a succeeding transmission frame.

If the reception of the SNN command is not identified in the step S12, the program proceeds to a step S14 to discriminate whether a token is received, and, if not, there is executed a regular reception procedure. If a token is received, the program proceeds to a step S15 to discriminate whether the received token is a first token from a node which has newly joined the network, by checking the SA area 43 in the token.

If it is a token from a newly joining node, a step S16 sends the SCONF command to said node which is the node c4 in this case. The SCONF command is transmitted by storing the content of the TBL of the RAM 16 into the data area 44 of the transmission frame shown in FIG. 4 and thereafter executing the regular transmission procedure shown in FIG. 6(B).

The regular transmission procedure is executed also in case the step S15 identifies a token from a node other than the newly joining node.

Other nodes a2, d5, e6 than the downstream node also recognize, in the steps S12 and S13, the new entry of the node c4 into the network, and the address "3" of the node c4 into the TBL in the RAM 16. However the steps S15, S16 are not executed since no token is received from said newly joining node c4.

Through the above-described procedure, the node c4 which has newly joined the network forms the network structure table TBL in the step S5, thus immediately recognizing the operable state of the nodes a2, b3, d5 and e6 in the network.

On the other hand, other nodes a2, b3, d5 and e6 recognize, in the step S13, the new entry of the node c4 into the network.

As explained in the foregoing, the node which has newly joined the network can immediately recognize the system structure of the network, so that the efficiency of communication in the network can be improved.

Also the network system can be constructed inexpensively since the recognition of the system structure can be recognized without the use of a particular monitor node.

In the foregoing embodiment, a newly joining node, in response to a first received token, sends data indicating the new entry to all other nodes, thus causing said other nodes to recognize the new entry.

In the following there will be explained a second embodiment in which one of the operable nodes which has detected the new entry of a node, sends data indicating the presence of a newly joining node to all other nodes.

Also in said second embodiment, the structure of the network and nodes and the structure of the data transmission frame are same as those in the first embodiment explained in relation to FIGS. 1 to 4, but the firmware stored in the CPU 15 of the node is different as will be explained in relation to FIG. 7.

Figure 7A:
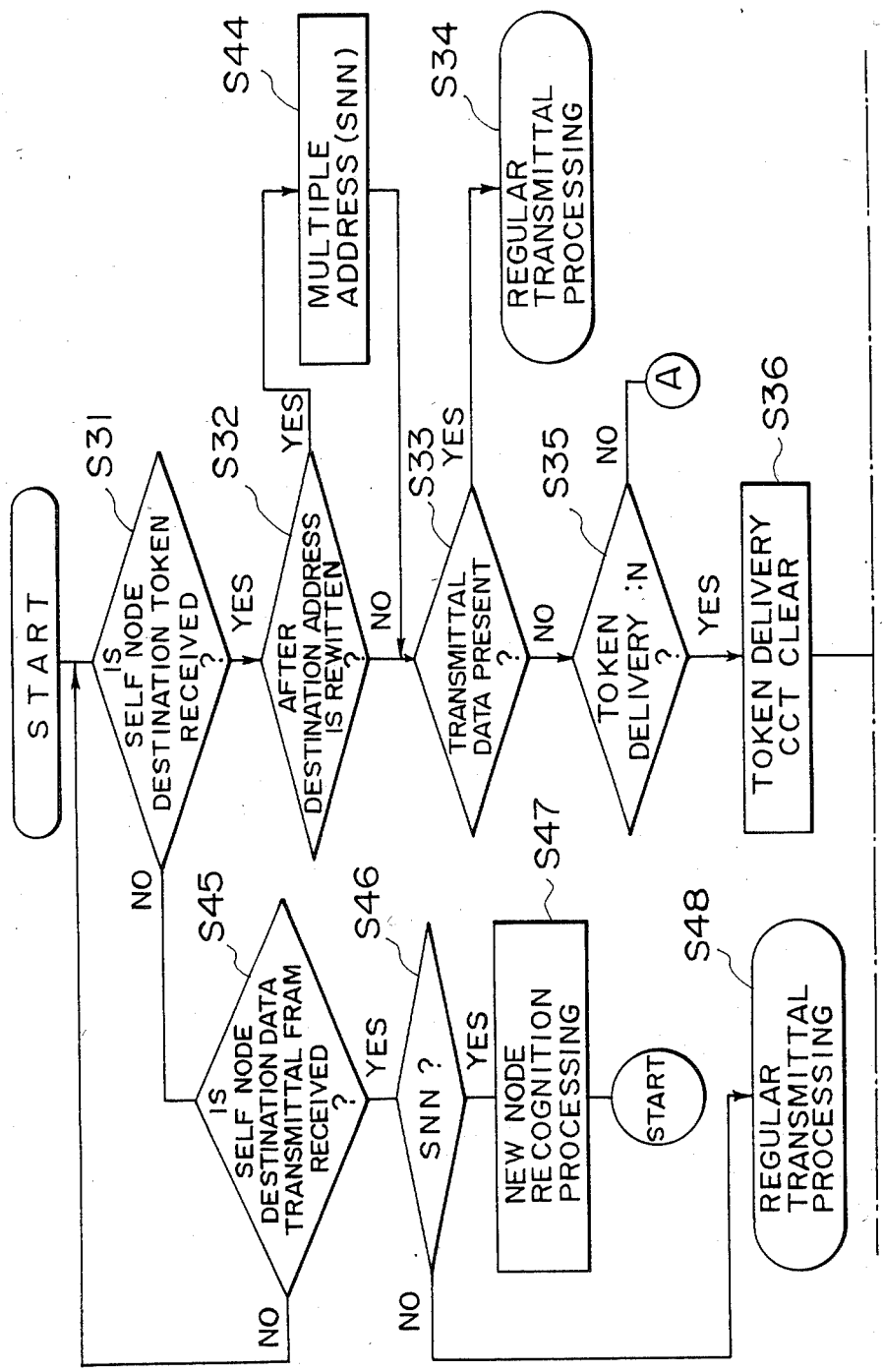

Now reference is made to a flow chart shown in FIG. 7 for explaining the procedure for recognizing the network structure in the local area network of the second embodiment.

In the normal state, the CPU 15 in a node 12 awaits the reception of a token from the transmission channel 1. The token frame contains a destination address, and a node receives the token and acquires the communication right when said destination address coincides with the own address designated by the self address setting unit 17.

The node which has acquired the right of communication by the reception of token sends data to the transmission channel 1 through the transceiver circuit 14 in case data transmission is requested for example by the office equipment 13. Upon completion of the transmission or in the absence of such request, the token is transferred to a downstream node.

In the network shown in FIG. 1, it is assumed that the nodes a2, b3, d5 and e6 are in operable state while the node c4 is not powered and not operable.

In this state it is also assumed that the network structure table TBL in the RAM 16 of each operable node is already formed and stores values a1=1, a2=2, a4=4 and a5=5 respectively corresponding to the nodes a2, b3, d5 and e6.

Now reference is made to a flow chart shown in FIG. 7 for explaining the details of data transmission control in the present embodiment, taking, as an example, the data transmission control in the node d5 when the power supply to the node c4 is turned on.

In case the node c4 is inoperable in the network system shown in FIG. 1, the token is circulated in the order of nodes e6, d5, b3, a2 and again e6. Consequently, for example in the node d5, the address b of the RAM 16 indicating the token destination stores the address "2" of the node b3. In this state the node d5 inspects, in a step S31, the reception of a token addressed to this node, and, upon reception thereof, a step S32 identifies whether the token destination address b in the RAM 16 shown in FIG. 3 has just been amended. If not, a step S33 identifies whether data transmission is requested by the office equipment 13 connected to the node. In the presence of a request, a step S34 executes a regular transmission procedure.

In the absence of request for data transmission in the step S33, the program proceeds to a step S35 to discriminate whether the number of token transfers is equal to a number N. The node d5 normally transfers the token to the node b3 but it tries, once in every N transfers, to transfer the token to the node c4 of the address "3" positioned between the node d5 of the address "4" and the node b3 of the address "2", thus identifying whether said node c4 has become operable.

If the number of token transfers is not equal to N, the program proceeds to a step S42 to send the token to a node designated by the token destination address b in the RAM 16, which is the node d5 in this example, then a step S43 stepwise increases the number of token transfers in a token count area in the RAM 16, and the program then returns to the step S31.

In case the step S35 identifies that the number of token transfers is equal to N, the program proceeds to a step S36 to clear said number to "0", and a step S37 investigates whether there is another address between the own address designated by the self node address setting unit 17 and the token destination address b stored in the RAM 16. In the present example there exists an address "3" between the address "4" of destination address "2" of the node b3, so that the program proceeds to a step S38 to generate and send a token having a destination address "3". Then the timer unit 19 is activated, and steps S39 and S40 inspect whether a transmission frame is sent from the node of the destination address within the preset time of the timer unit 19. In the absence of reception of said transmission frame within said time, indicating that the node c4 is still inoperable, the program proceeds from the step S40 to a step S42 for sending the token to the node b3 corresponding to the token destination address "2" stored in the RAM 16.

On the other hand, if the node c4 is powered and is capable of joining the network, it acquires the communication right be the token from the node d5, thus sending the transmission frames such as token. The node d5 detects said sending in the step S39, and the program then proceeds to a step S41 whereby the destination address b in the RAM 16 is changed from "2" to "3" since the node c4 has newly joined the network and the address "3" thereof has become effective. Then the program returns to the step S31 to await the reception of the token from the node e6.

Upon reception of the token, the program proceeds from the step S32 to a step S44 to send a new entry notice command (hereinafter called SNN), indicating the new entry of the node c4, to all the nodes in the network. Said command is transmitted simultaneously to all the nodes in one transmission, for example by setting "1" in all bits constituting the destination address area 42 and using a global address indicating a simultaneous transmission to all the nodes at the same time. However, said transmission may naturally be made individually to each node. The data area 44 of the SNN command contains the address of the newly joining node, which in this example is the address "3" of the node c4. After said transmission the program proceeds to the step S33 for executing a regular procedure.

Thereafter an intermediate address no longer exists between the own address "4" defined by the self address setting unit 17 and the address "3" of the token destination address b in the RAM 16. Consequently the program proceeds from the step S37 to the step S42 even when the number of token transfers becomes equal to N, and the new node detecting procedure starting from the step S38 is not executed.

In the nodes a2, b3 and e6, in response to the reception of a transmission frame addressed to these nodes utilizing the aforementioned global address, the program proceeds from the step S45 to a step S46 for inspecting the reception of an SNN command. If it is received, the program proceeds to a step S47 to investigate the value in the data area 44 of the SNN command, thus recognizing the entry of a new node c4, with the address "3", into the network, and the program then returns to the step S31.

If the step S46 identifies that the SNN command has not been received, the program proceeds to a step S48 to execute the regular reception procedure.

In the above-described manner, all the nodes in the network can simultaneously recognize, at the step S47 or S44, the new entry of the node c4 without the use of a particular monitor node.

Otherwise the node c4, which has newly joined the network, can immediately recognize the network structure by requesting the information on the network structure from the node d5 after receiving the token therefrom.

As explained in the foregoing, this second embodiment allows all the nodes in the network to recognize the new entry of a node into the network without the use of a particular monitor node, by means of an SNN command from a node which has detected said new entry. In this manner it is rendered possible to improve the efficiency of communication in the network, to improve the reliability of the system and to construct the system in inexpensive manner.

The present invention has been explained by certain preferred embodiments thereof, but it should be understood that the present invention is not limited to such embodiments but is subject to various modifications within the spirit and scope of the appended claims.

What is claimed is:

1. A network system including a plurality of nodes, connected to each other through a communciation medium, wherein only a node to which a communication right has been assigned is able to perform data transmission between that node and another node, wherein each of the nodes comprises:
   means for assigning the communication right to another node of said plurality of nodes;
   means for transmitting a specific command which contains data indicating an address of the transmitting node to all of the other nodes of said plurality of nodes, when the communication right is assigned first from any one of the other nodes of said plurality of nodes after its entry into the network system; and means for recognizing the address of the new entry node into the network system on the basis of the data contained in the specific command, upon receipt of the specific command transmitted from another node.

2. A network system according to claim 1, wherein each of said nodes is provided with memory means for storing addresses of the nodes constituting the network system and is adapted to add the address of the new entry node to said memory means in response to said specific command.

3. A network system according to claim 1, wherein said specific command is simultaneously transmitted to all other nodes constituting the network system.

4. A network system according to claim 1, wherein said assigning means is adapted to retrieve another node of said plurality nodes to which the communication right is to be assigned.

5. A network system according to claim 1, wherein each of said plurality of nodes has a respective address, and said assigning means is operable to transmit a predetermined command indicating that the communication right will be assigned to another node having an address which is associated with the respective address, and assign the communication right, upon receipt of a response to the predetermined command, to another node which has responded to the predetermined command.

6. A network system including a plurality of nodes, connected to each other through a communication medium, wherein only a node to which a communication right has been assigned is able to perform data transmission between that node and another node, wherein each of the nodes comprises:

means for assigning the communication right to another node of said plurality of nodes;

means for transmitting a specific command to all of the nodes of said plurality of nodes, when the communication right is assigned first from any one of the other nodes of said plurality of nodes after its entry into the network system; and means for informing the node which transmitted said specific command of addresses of the nodes constituting the network, in the event that the communication right is assigned from another node after receipt of said specific command.

7. A network system according to claim 6, wherein each of said nodes is provided with memory means for storing the addresses of the nodes contsitiuting the network system.

8. A network system according to claim 6, wherein said informing means of a node having an address immediately following the address of said new entry node informs of addresses of the nodes constituting the network.

9. A network system according to claim 6, wherein said assigning means is adapted to retrieve another node of said plurality nodes to which the communication right is to be assigned.

10. A network system according to claim 6, wherein each of said plurality of nodes has a respective address, and said assigning means is operable to transmit a predetermined command indicating that the communication right will be assigned to another node having an address which is associated with the respective address, and assign the communication right, upon receipt of a response to the predetermined command, to another node which has responded to the predetermined command.

11. A network system including a plurality of nodes, connected to each other through a communication medium, wherein only a node to which a communication right has been assigned is able to perform data transmission between that node and another node, wherein each of the nodes comprises:

means for assigning the communication right to another node of said plurality of nodes;

means for detecting new entry of another node into the network system;

means for transmitting a specific command which contains data indicating an address of the new entry node to all of the other nodes of said plurality of nodes, when the communication right is assigned from any one of the other nodes of the plurality of nodes after detection of the new entry of another node into the network system; and means for recognizing the address of the new entry node into the network system on the basis of the data contained in the specific command, upon receipt of the specific command transmitted from another node.

12. A network system according to claim 11, wherein said detecting means periodically detects the presence of a new entry node.

13. A network system according to claim 11, wherein the speicfic command is simultaneously transmitted to all other nodes constituting the network system.

14. A network system according to claim 11, wherein each of said nodes is provided with memory means for storing the addresses of the nodes constituting the network system.

15. A network system accoridng to claim 11, wherein each of said plurality of nodes has a respecitve address, and said detecting means is operable to transmit a predetermined command to another node having an address which is associated with the respective address and detect the presence of the new entry node upon receipt of a response to the predetermined command.

16. A netwrok system according to claim 11, wherein said assigning means is adapted to retrieve another node of said plurality nodes to which the communication right is to be assigned.

17. A network system according to claim 11, wherein each of said plurality of nodes has a respective address, and said assigning means is operable to transmit a predetermined command indicating that the communication right will be assigned to another node having an address which is associated with the respective address, and assign the communication right, upon receipt of a response to the predetermined command, to another node which has responded to the predetermined command.

* * * * *

UNITED STATES PATENT AND TRADEMARK OFFICE
CERTIFICATE OF CORRECTION

PATENT NO. : 4,785,449
DATED : November 15, 1988
INVENTOR(S) : YASUO NAKAMURA, ET AL.   Page 1 of 2

It is certified that error appears in the above-identified patent and that said Letters Patent is hereby corrected as shown below:

FIG. 2

Block 14, "TRANCEIVER CCT" should read --TRANSCEIVER CCT--.

In bottom, right corner of box, "TRANCEIVER NODE" should read --TRANSCEIVER NODE--.

FIG. 7A

Block S32, "IS REWITTEN" should read --IS REWRITTEN--.

FIG. 7B

Block S43, "NUNBER OF TOKEN" should read --NUMBER OF TOKEN--.

COLUMN 3

Line 6, "formal" should read --format--.

COLUMN 7

Line 40, "of desti-" should read --of the node d5 and the current token desti- --.

UNITED STATES PATENT AND TRADEMARK OFFICE
CERTIFICATE OF CORRECTION

PATENT NO. : 4,785,449
DATED : November 15, 1988
INVENTOR(S) : YASUO NAKAMURA, ET AL.    Page 2 of 2

It is certified that error appears in the above-identified patent and that said Letters Patent is hereby corrected as shown below:

COLUMN 9

Line 19, "plurality nodes" should read --plurality of nodes--.
Line 51, "contsitiuting" should read --constituting--.
Line 61, "plurality nodes" should read --plurality of nodes--.

COLUMN 10

Line 36, "speicfic" should read --specific--.
Line 42, "accoridng" should read --according--.
Line 43, "respecitve" should read --respective--.
Line 49, "netwrok" should read --network--.
Line 51, "plurality nodes" should read --plurality of nodes--.

Signed and Sealed this

Nineteenth Day of December, 1989

Attest:

JEFFREY M. SAMUELS

Attesting Officer    Acting Commissioner of Patents and Trademarks